United States Patent
Michael et al.

(10) Patent No.: US 6,240,218 B1
(45) Date of Patent: *May 29, 2001

(54) APPARATUS AND METHOD FOR DETERMINING THE LOCATION AND ORIENTATION OF A REFERENCE FEATURE IN AN IMAGE

(75) Inventors: David Michael, Newton; Arman Garakani, Cambridge, both of MA (US)

(73) Assignee: Cognex Corporation, Natick, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/404,388

(22) Filed: Mar. 14, 1995

(51) Int. Cl.$^7$ .................................................. G06K 9/36
(52) U.S. Cl. ......................... 382/289; 382/170; 382/287
(58) Field of Search ................................. 382/151, 168, 382/170, 209, 287, 289; 356/401; 364/474.34; 707/908

(56) References Cited

U.S. PATENT DOCUMENTS

| | | | |
|---|---|---|---|
| 4,677,301 | * 6/1987 | Tanimoto et al. | 250/548 |
| 5,020,006 | * 5/1991 | Sporon-Fiedler | 382/151 |
| 5,493,403 | * 2/1996 | Nishi | 356/401 |
| 5,506,918 | * 4/1996 | Ishitani | 382/289 |
| 5,543,921 | * 8/1996 | Uzawa et al. | 356/401 |
| 5,627,912 | * 5/1997 | Matsumoto | 382/168 |

* cited by examiner

Primary Examiner—Matthew C. Bella
(74) Attorney, Agent, or Firm—Russ Weinzimmer

(57) ABSTRACT

A method and apparatus for determining the location and orientation of a reference feature in an image is provided. At train-time, a template image is created for use during the run-time phase. At run-time, a reference feature is located by first determining the principal angle of the reference feature. In a preferred embodiment, the principal angle θ of the reference feature is found by partitioning the reference feature into a plurality of regions, projecting each of the regions at 0°, and performing template matching with a template image to determine the position of a plurality of points along a principal axis of the reference feature. Then, either an equation of a "best fit" line can be calculated and solved simultaneously with an equation of a horizontal reference line, or the reference feature image can be projected at the angle of the "best fit" line to obtain a one-dimensional reference image which can be matched to the one-dimensional template image to find the relative displacement between them that maximizes a match-metric value. The invention is particularly useful for determining the location and orientation of reference feature images that have been degraded in some way. The invention provides substantial immunity to such image degradation by comprehensively exploiting image information derived from the entire image of the reference feature.

10 Claims, 15 Drawing Sheets

APPARATUS AND METHOD FOR DETERMINING THE LOCATION AND ORIENTATION OF A REFERENCE FEATURE IN AN IMAGE

FIELD OF THE INVENTION

This invention relates generally to machine vision, and particularly to automated visual pattern location.

BACKGROUND OF THE INVENTION

The process of making an integrated circuit from a silicon wafer employs photolithography, which includes the step of transferring geometric patterns, called features, to a photosensitive film applied to the surface of the wafer. Some of these features become the various circuit elements (transistors, resistors, capacitors, etc.) of the integrated circuit, and some features are used for alignment and registration.

A stepper, also called a stepping aligner, is an optical system that repeatedly projects a geometric pattern onto the photosensitive film-coated wafer over a sequence of positions on the surface of the wafer. After each projection of the geometric pattern, the wafer is moved, i.e., "stepped," to a new position, and the projection is repeated.

The step of transferring a single geometric pattern at a position on the silicon wafer is called a masking step. During the fabrication of an integrated circuit, several masking steps are performed at each position, each masking step overlaying a different geometric pattern over the previous ones. The pattern that results from a sequence of masking steps is shown in FIG. 1, where the progression from a single mask pattern to a complex overlap of many geometric patterns is indicated by the arrow 18.

Before each masking step, the pattern to be transferred to the wafer must be precisely sized and aligned with respect to the previous patterns. To accomplish this alignment, the surface of the wafer is visually inspected, typically using an optical device. However, each masking step changes the visual appearance of the wafer's surface. These changes in appearance commonly include distortion and degradation of fiducial marks or other reference features used to achieve alignment visually. Consequently, it is difficult to achieve accurate and repeatable visual alignment over a sequence of masking steps.

Further, known alignment techniques require that the reference features be clearly distinguishable with respect to background features and random noise. However, each photolithographic step can change the appearance of the reference features on the wafer to an extent that, after a sequence of masking steps, the reference feature becomes indistinguishable from background image noise. Moreover, a masking step can introduce a change in image polarity, which introduces further difficulty.

A known method for locating a reference feature is to perform a two-dimensional search using, for example, the Search Tool, as sold by Cognex Corporation, Natick, Mass. However, this method is impractical whenever the reference features of the object under inspection are degraded by one or more processing steps. Moreover, since each processing step has an unpredictable effect on the appearance of the object's features, is difficult to train a search model for use with more than one masking step. In addition, rotation may be introduced between masking steps, which a two-dimensional search tool typically cannot accommodate.

SUMMARY OF THE INVENTION

The invention is a method and apparatus for determining the location and orientation of a reference feature in an image. The invention includes two phases: a train-time phase and a run-time phase. At train-time, a template image is created for use during the run-time phase. At run-time, a reference feature is located by first determining the principal angle of the reference feature. The projected image is similar to the template image in that it also has the form of an X-$\Sigma$I plot, i.e., a plot of summed pixel intensity as a function of displacement along an axis of a coordinate system. In a preferred embodiment, the principal angle $\theta$ of the reference feature is found by partitioning the reference feature into a plurality of regions, and in a preferred embodiment, projecting each of the regions at 0° and performing template matching with a template image to determine the position of a plurality of points along a principal axis of the reference feature. Then, either an equation of a "best fit" line can be calculated and solved simultaneously with an equation of a horizontal reference line, or the reference feature image can be projected at the angle of the "best fit" line to obtain a one-dimensional reference image which can be matched to the one-dimensional template image to find the relative displacement between them that maximizes a match-metric value. Each way of exploiting the principal angle information of the "best fit" line results in a value for displacement along an axis that indicates the location of the reference feature image.

The invention is particularly useful for determining the location and orientation of reference feature images that have been degraded in some way, either by problems of lighting, variations in surface optical properties introduced by process steps, such as semiconductor processing steps, partial image occlusion, and video signal degradation, such as the introduction of video noise.

The invention provides substantial immunity to such image degradation by comprehensively exploiting image information derived from the entire image of the reference feature. The invention recognizes that it is advantageous to span three independent dimensions, i.e., time, length, and width, to extract an image signal with optimized signal-to-noise ratio.

In particular, by using video averaging, various instances of an image over time can be combined to provide an image with less noise than any constituent image.

By projecting a two-dimensional reference feature image to provide a one-dimensional image, image information of the entire length of the reference feature is consolidated, thereby providing a one-dimensional image that is more robust than the two-dimensional image.

Additionally, matching over the entire one-dimensional image exploits information over the entire width of the image.

BRIEF DESCRIPTION OF THE DRAWINGS

The invention will be more fully understood from the following detailed description, in conjunction with the accompanying figures, wherein.

DETAILED DESCRIPTION OF THE DRAWINGS

Figure 4:
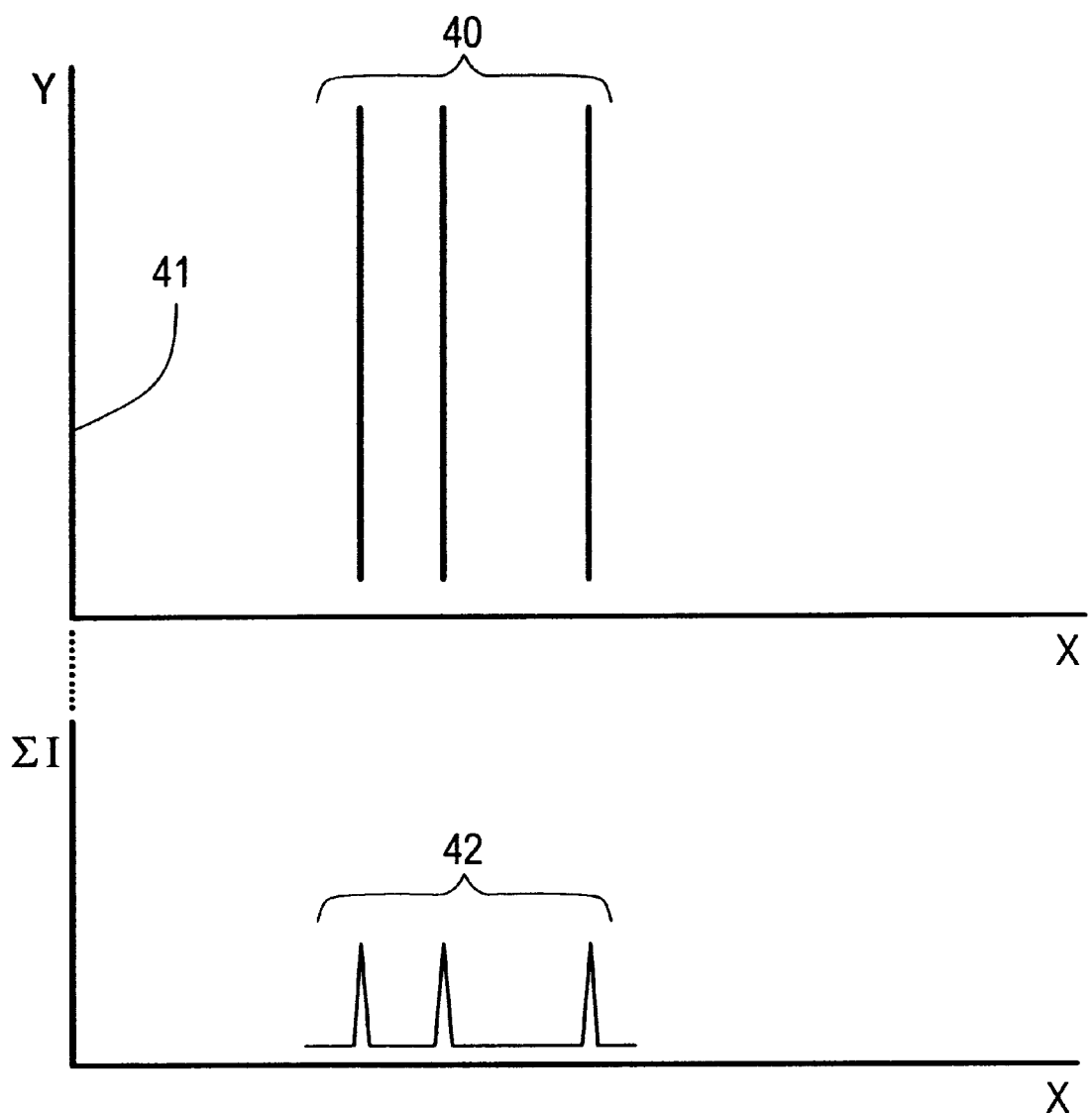
FIG. 4 is a combined graphical representation of a reference feature in an X-Y coordinate system oriented in the Y-direction, and an X-$\Sigma$I plot of summed pixel intensity I of the reference feature taken in the Y-direction.

The invention includes two phases: a train-time phase and a run-time phase. At train-time, a template image must be created for use during the run-time phase. For various instances of a template image, see the X-ΣI plots of any of FIGS. 4–7, for example. At run-time, a reference feature 40 is found by first creating a projected image 42 of the reference feature, as shown in FIG. 4. The projected image looks somewhat like the template image in that it also has the form of an X-ΣI plot.

Figure 13B:
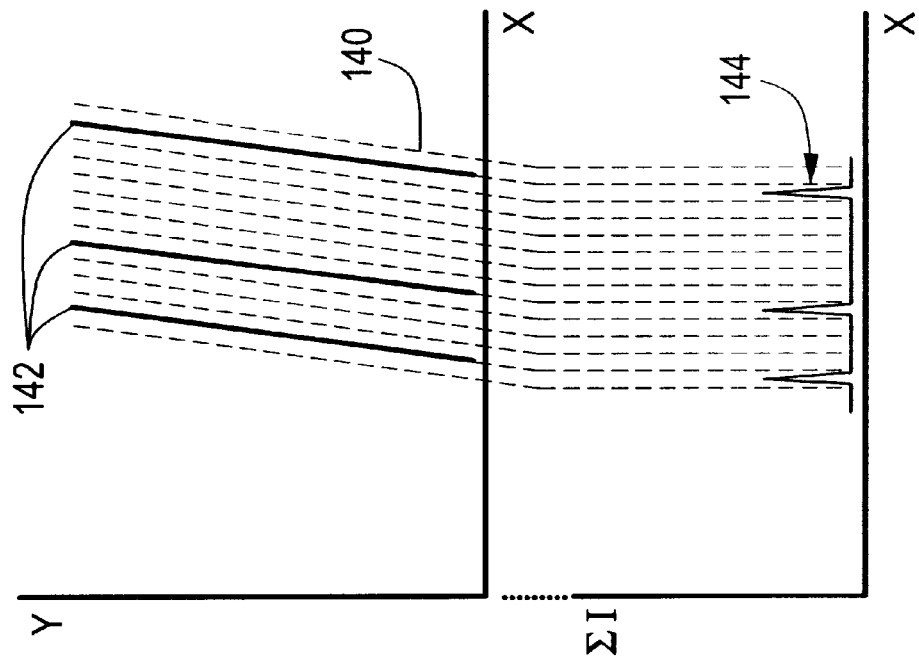
FIG. 13B is a combined graphical representation of a reference feature in an X-Y coordinate system oriented at an angle relative to the Y-direction, and an X-ΣI plot of summed pixel intensity I of the reference feature taken at the same angle relative to the Y-direction.

The performance of the method of the invention can be further enhanced when the wafer is slightly rotated with respect to the reference axis Y by projecting along the angle of rotation, as is shown in FIG. 13B, instead of at 0°, as is shown in FIGS. 4–7, and 13A.

Figure 5:
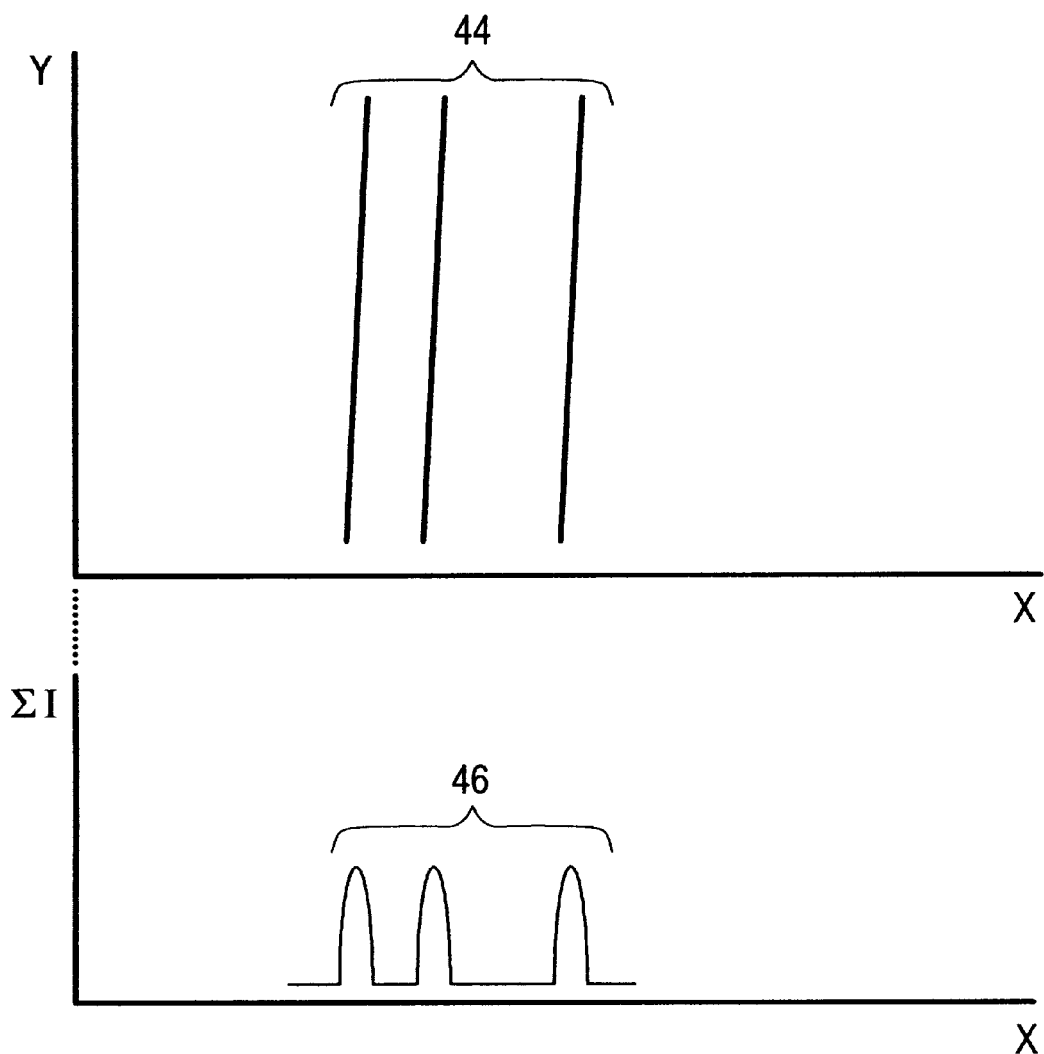
FIG. 5 is a combined graphical representation of a reference feature in an X-Y coordinate system oriented almost parallel to the Y-direction, and an X-ΣI plot of summed pixel intensity I of the reference feature taken in the Y-direction.
Figure 6:
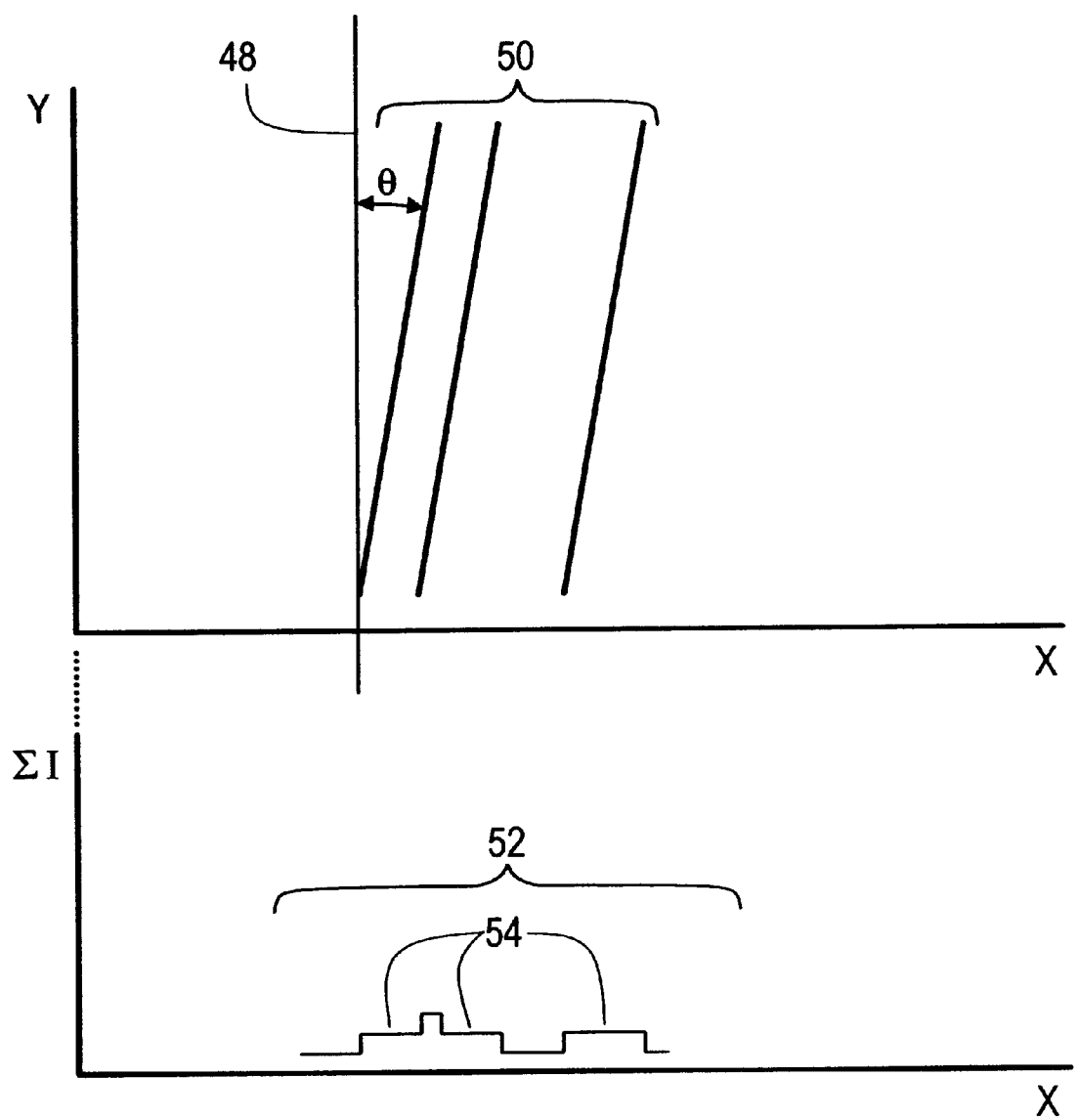
FIG. 6 is a combined graphical representation of a reference feature in an X-Y coordinate system oriented at a substantial incline to the Y-direction, and an X-ΣI plot of summed pixel intensity I of the reference feature taken in the Y-direction.

In particular, when the wafer is rotated by an unknown angle with respect to the reference axis Y, the reference features 44 and 50, for example, are also rotated by the unknown angle. As recognized by the invention, this causes the one-dimensional summation signal of each feature to be degraded. As shown in FIG. 5, slightly rotated reference feature 44 causes a slight degradation of the one-dimensional summation signal 46. The signal is considered to be degraded because the peaks are too wide, indicating uncertainty in their horizontal position. In addition, the magnitude of the peaks becomes too small. The net effect of the rotation by the unknown angle is to substantially reduce the signal-to-noise (s/n) ratio of the summation signal 52. Comparing FIG. 6, substantially rotated reference features 50 causes severe degradation of the one-dimensional summation signal 52, as the peaks of individual features overlap, introducing even greater uncertainty.

Thus, to enhance the signal-to-noise ratio of the projected image, first the principal angle θ of the reference feature is found.

The principal angle θ is the angle of the principal axis of the reference feature with respect to a line perpendicular to the X-axis, such as the Y-axis, or a line 48 that is parallel to the Y-axis. Thus, if the principal axis is perpendicular to the X-axis, then the principal angle θ is 0°. The principal axis of the reference feature is a straight line that is parallel to most or all of the lines that make up the reference feature. If the reference feature contains only one line, then the principal axis is co-linear with respect to the line. If the reference feature contains a plurality of lines, then the principal axis can be co-linear with respect to any of the lines, or can be substantially parallel with respect to most of the lines. In the field to semiconductor fabrication, the principal axis can be defined in relation to the flat, or other fiducial mark, of the semiconductor wafer.

Then, a projection step is performed at the principle angle of the reference feature, i.e., along the direction of the principal axis of the reference feature.

Next, since distances in the one-dimensional reference image that result from projection at the principal angle may not be commensurate with distances in the one-dimensional template image, depending on the projection method used and on the aspect ratio of the pixels, the distance scale of either the reference image or the template image must be rescaled by a multiplicative factor.

Then, a global match is performed by computing a match-metric for each of a plurality of relative displacements of the template image with respect to the projected image. Next, a global maximum of the match-metric is found, and the relative displacement associated with the global maximum is found. The position of the reference feature is computed using the relative displacement associated with the global maximum.

The template image can be created using synthetic training, empirical training, or any other technique for creating a template image that represents a reference feature to be located.

Figure 8:
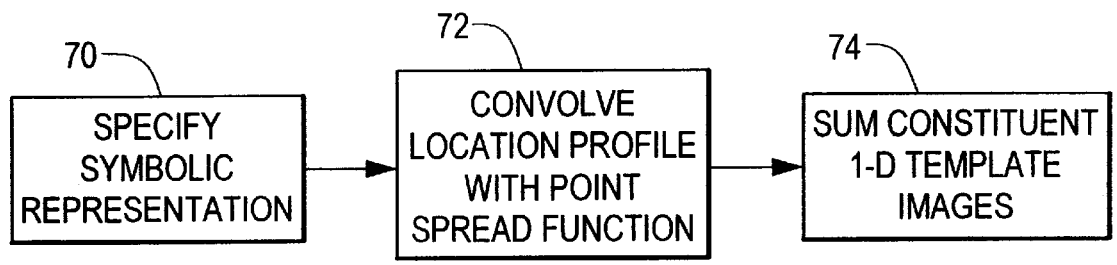
FIG. 8 is a flow chart of the steps for creating a template image at train-time using the "synthetic" training method.
Figure 9:
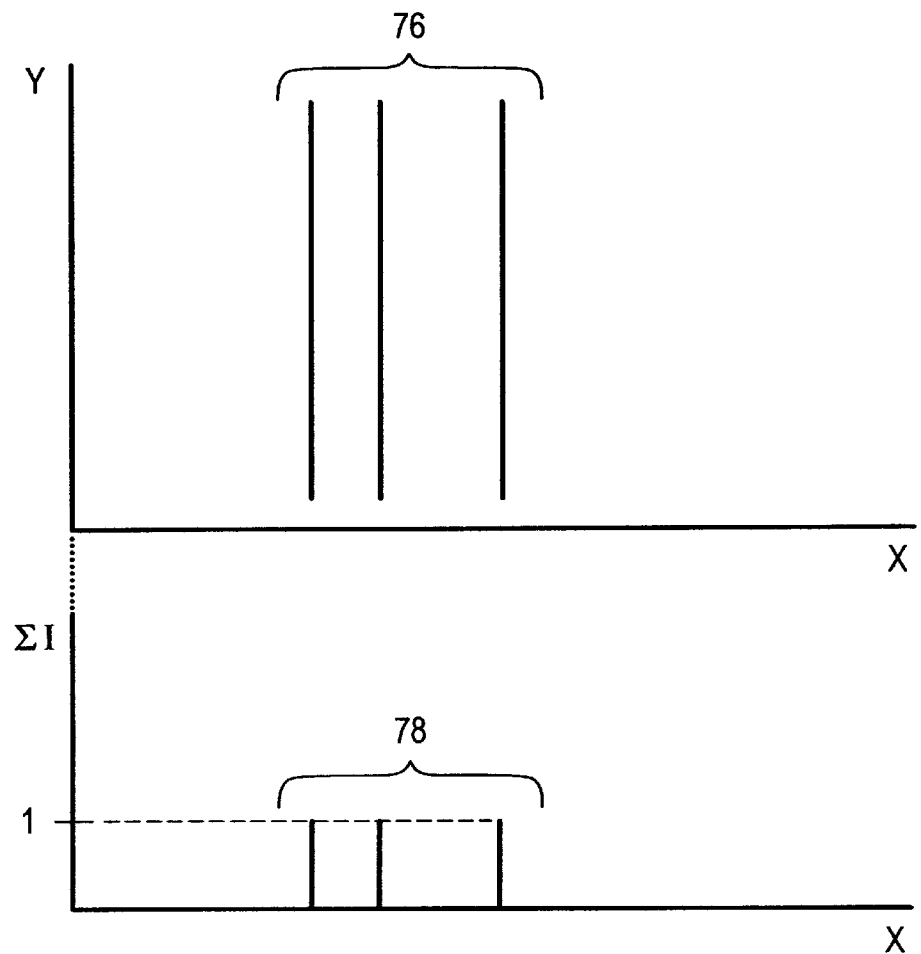
FIG. 9 is a combined graphical representation of an ideal reference feature in an X-Y coordinate system, and an X-ΣI plot of the reference feature having three unit impulses of no width.
Figure 10:
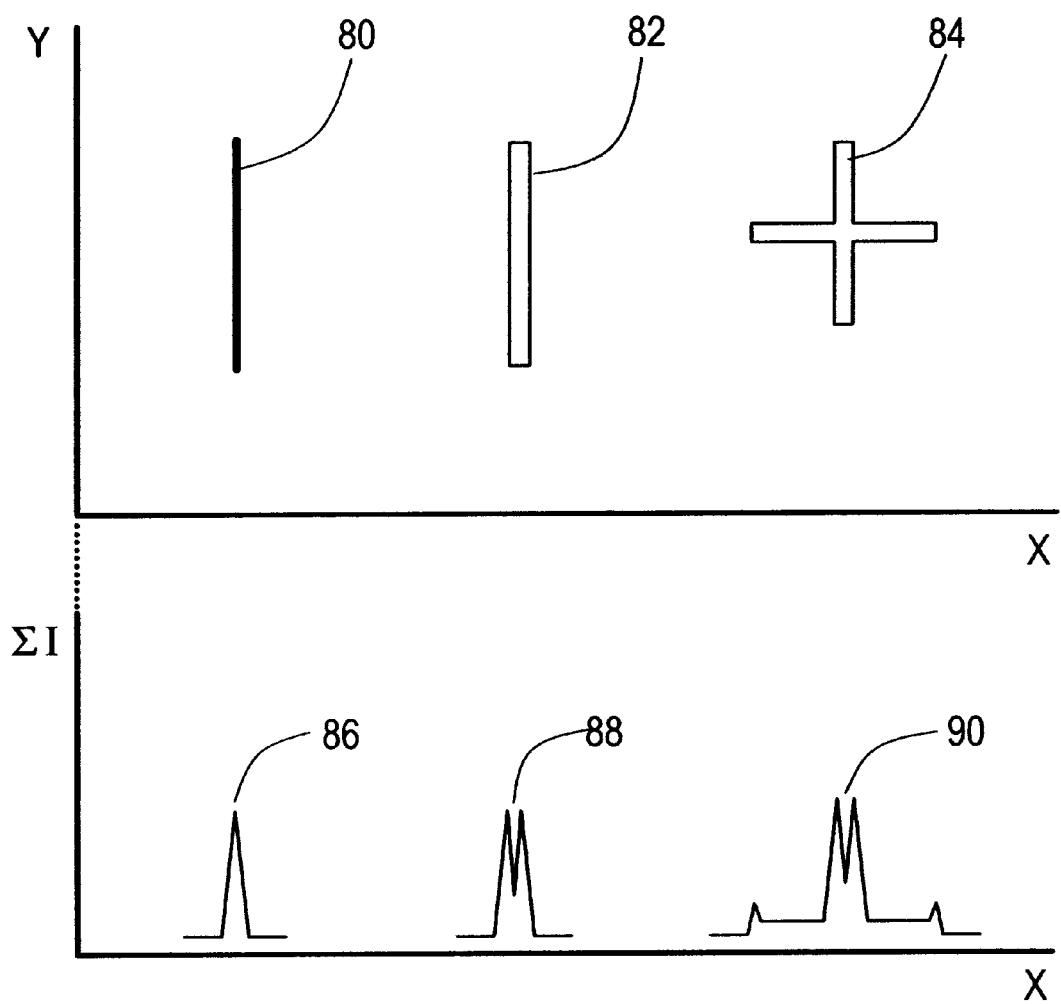
FIG. 10 is a combined graphical representation of three ideal reference features in an X-Y coordinate system, and a "point spread function", i.e., an ideal X-ΣI plot for each of the reference features.

Referring to FIG. 8, in synthetic training, the user specifies a symbolic representation (70) of various characteristics of the expected (or ideal) reference feature, such as a plurality of parallel bars or lines, to be found on a semiconductor wafer. The symbolic representation of the expected reference feature can include the following data:

location: the location along one dimension (e.g., along the x or y axis) of each component of the reference feature. As illustrated in FIG. 9, each component of the reference feature 76 can be represented by a unit impulse (of 0 width) 78 in an X-ΣI plot. A sequence of reference feature component locations is called a location profile. The location profile can be used to create a template image, as will be discussed below.

point spread function: a one-dimensional summation signal profile associated with a single reference feature, such as a bar or a line. Referring to FIG. 10, this signal profile represents the shape of the expected one-dimensional summation signal (e.g., 86, 88, or 90) associated with detection of a particular reference feature (e.g., 80, 82, or 84, respectively). To create a one-dimensional template image for use at run-time, each unit impulse representing a reference feature location is replaced with its respective signal profile by mathematically convolving (72) the location profile with the point spread function of each of its features. If there are several types of reference features, for example, bars and lines, a separate location profile is specified for each type of feature. Each location profile is convolved separately with the appropriate point spread function for that feature. The results of the convolutions (i.e., several synthetic one-dimensional template images) are then summed (74) to provide a single synthetic one-dimensional template image, which can be implemented as an array of pixel values in memory.

origin: a reference point in the template image, typically located on one of the features. The numerical value of the offset of the actual (found) feature is measured with respect to the origin. The origin is expressed as a single value (e.g., an x location value within the one-dimensional template image).

scale: the number of microns on the physical object (e.g., a wafer) represented by each pixel of an image of the object. The scale is typically expressed as a ratio of microns per pixel. For example, a scale of 1.7 means that each pixel of the image represents 1.7 microns on the physical object. The scale also indicates the number of microns of displacement of the physical object represented by the relative displacment (measured in projected pixel units) associated with the global maximum.

Figure 11:
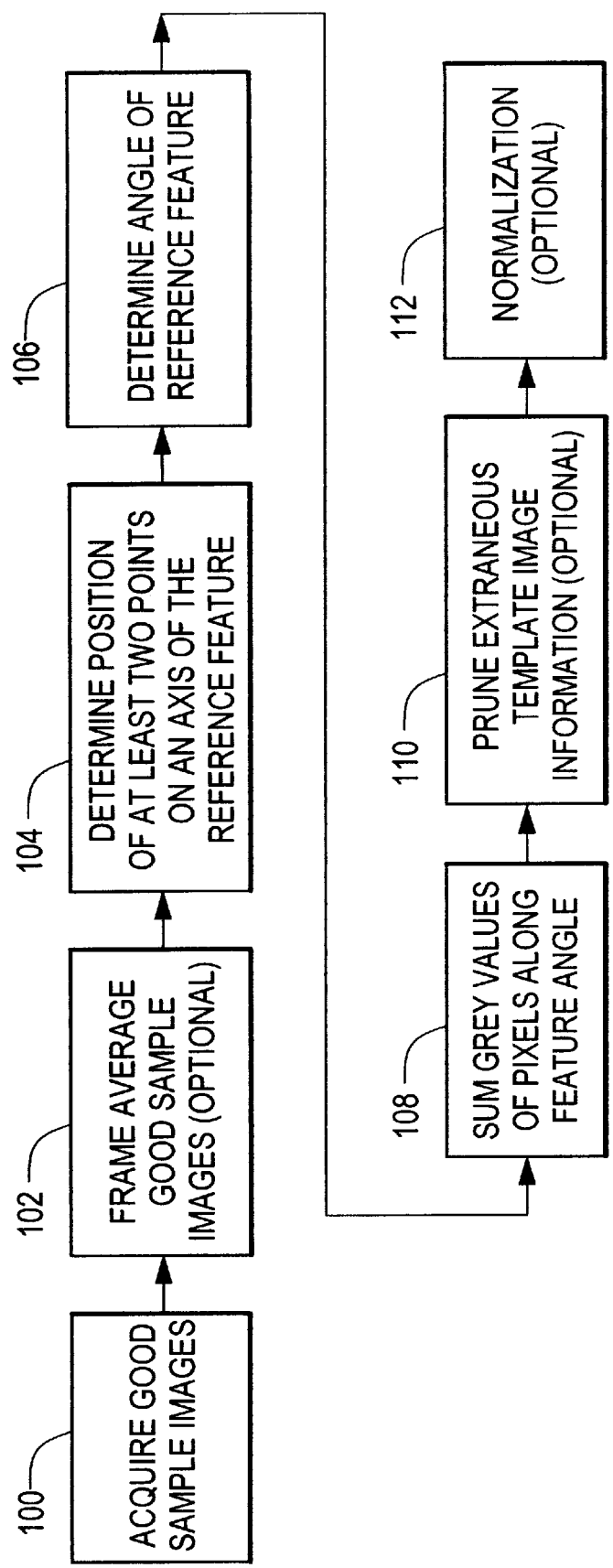
FIG. 11 is a flow chart of the steps for creating a template image at train-time using the "direct" training method.

Referring to FIG. 11, empirical training is another method for creating a template image. Empirical training uses one or more actual images of "known good" samples that include a reference feature to be located so as to create a template image that represents the reference feature. First, at least one image of a "known good" sample is acquired (100). Optionally, "frame averaging" can then be performed (102) by averaging several "known good" sample images together to obtain a reduced-noise sample image. One way to perform the averaging is to average each pixel of each known good sample image with the corresponding pixel of the other known good sample images after all of the sample images have been acquired to provide the reduced-noise sample image. Alternatively, a running average can be computed for each pixel of the reduced-noise sample image. Regardless of the particular averaging method used to compute the reduced-noise sample image, frame averaging provides a reduced-noise sample image with a higher signal-to-noise ratio than any of the individual known good sample images. The image that is used to represent the ideal or expected image, whether the image is frame-averaged or not, is called the training image.

The goal now is to create a template image of the reference feature by projecting, i.e, summing along an axis parallel to the principal axis of the reference feature, and rotating the resulting image by the principal angle θ of the reference feature so as to obtain an X-ΣI plot that can serve as the template image. Thus, it is first necessary to determine the principal angle of the reference feature (106).

The projection step can be performed as described above, or can be accomplished using any one of a number of projection techniques and tools, such as "Cubic Convolution Interpolation for Digital Image Processing" by Robert G. Keys (IEEE Transactions on Acoustic, Speech and Signal Processing, Vol. ASSP-29, No. 6, December 1981) (slowest and most accurate); "Bilinear Projection", as described in the book *Numerical Recipes,* by Press et al., p. 96; the Projection Tool™ sold by Cognex Corporation, Skewed Projection tool found in Caliper Tool™ sold by Cognex Corporation (fastest and least accurate); and a projection technique that is the subject matter of co-pending U.S. pat. application Ser. No. 08/236,214, filed Apr. 30, 1994, for example. This last technique is preferable for some applications.

To determine the principal angle of the reference feature (106), the position along the X-axis is determined (104) of at least two points on a line parallel to the principal axis of the reference feature. The equation of a "best fit" line for the points can then be determined, such as by using linear regression, thereby providing the principal angle θ. Knowing the principal angle θ, the angle of the principal axis is known, making it possible to project in the direction of the principal axis of the reference feature to obtain an X-ΣI plot that is inclined with respect to the X-axis. The resulting X-ΣI plot can be used provided that the distance scale disparity between the templates has been compensated by a multiplicative factor.

The position along the X-axis of at least two points on a line parallel to the principal axis of the reference feature can be determined by performing a plurality of one-dimensional searches in the direction of the X-axis and along the length of the reference feature. The X-coordinates of the points found in the one-dimensional searches can be used as described above to determine the principal angle of the reference feature.

The one-dimensional searches can be performed using any one of a plurality of traditional one-dimensional searching methods or tools, such as by analyzing the angle histogram of the feature edges; using a Hough line finder; using an edge detector (for example, the Edge Detection Tool, as sold by Cognex Corporation, Natick, Mass.); or performing an edge-to-edge measurement (for example, using the Caliper Tool, as sold by Cognex Corporation, Natick, Mass.).

Figure 12:
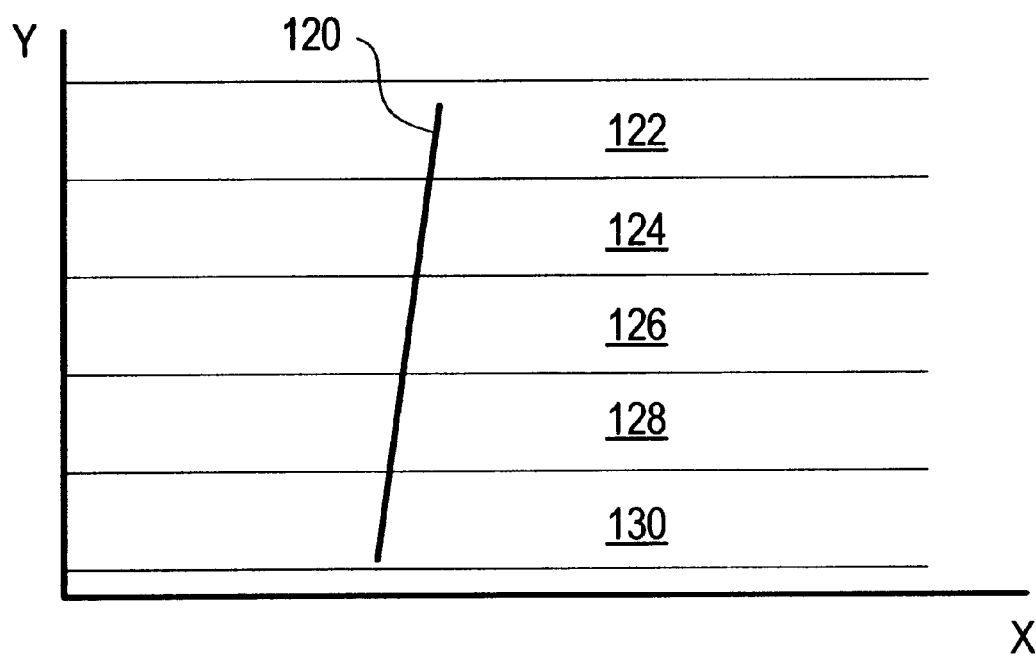
FIG. 12 is a graphical representation of a reference feature in an X-Y coordinate system, the reference feature being partitioned into a plurality of regions so as to generate a plurality of partial X-ΣI plots of summed pixel intensity I of the reference feature taken in the Y-direction.
Figure 13A:
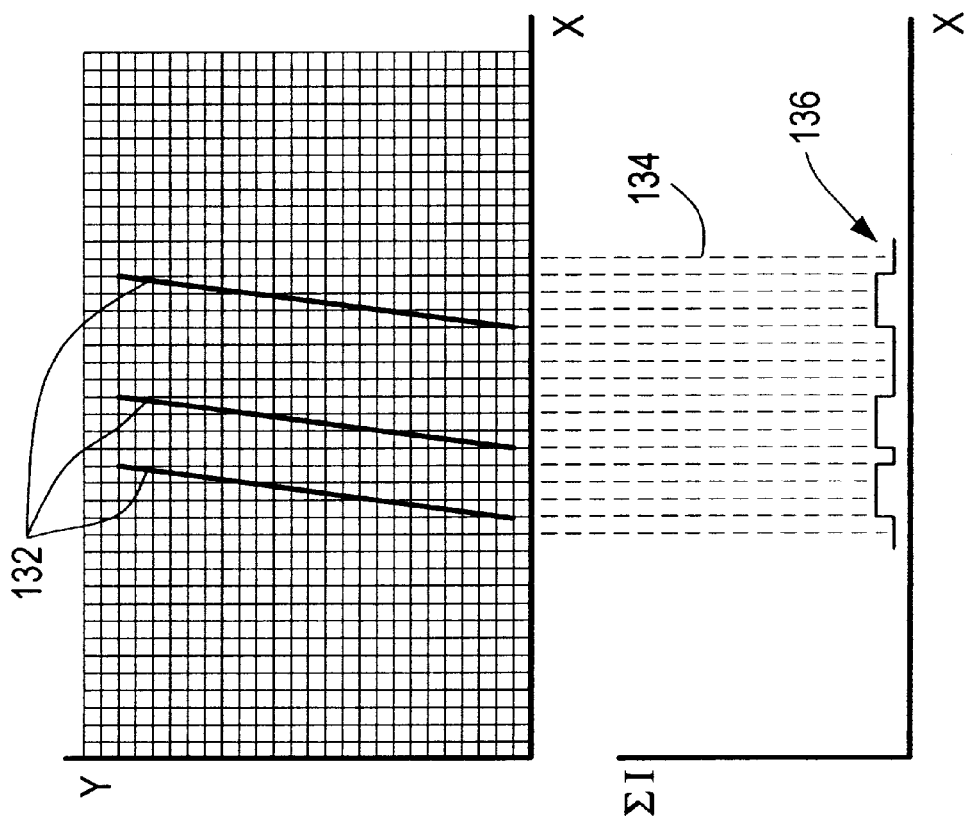
FIG. 13A is a combined graphical representation of a reference feature in an X-Y coordinate system oriented at an incline to the Y-direction, and an X-ΣI plot of summed pixel intensity I of the reference feature taken in the Y-direction.

Alternatively, the one-dimensional search method of the invention (projection, followed by global matching of X-ΣI plot template images) can be used repeatedly to determine the position along the X-axis of at least two points on a line parallel to the principal axis of the reference feature. To do this, the reference feature is partitioned into at least two search regions. FIG. 12 illustrates a partitioning of the reference feature 120 into five projection regions 122, 124, 126, 128, and 130. The First, self-search template is created by projecting some or all of the reference feature along the direction perpendicular to the X-axis, i.e., at 0°. Thus, any one of the projection regions 122, 124, 126, 128, or 130, or any additive combination of them, can be used as the basis for the self-search template. The self-search template is an X-ΣI plot template image. FIG. 13A is an example of a template based on a projection of the entire reference feature at 0°.

Next, at least two of the regions are projected at 0° to obtain a local template image. By finding the global match of the self-search template image with the local template for the at least two regions, at least two X-positions can be found.

Knowing at least two X-positions, the principle angle θ can now be found, as explained above, using linear regression, or the like. Thus, it is now possible to create a template image of the reference feature by projecting along the principal axis 140 of the reference feature 142, as shown in FIG. 13B. The resulting image is rotated by the principal angle θ of the reference feature to obtain an X-ΣI plot 144 that can serve as the template image.

After the template image has been generated, scale and origin information is associated with it, so that the final result is the same as that provided by the synthetic method, explained above. The scale and origin information can be specified by the user.

Regarding the origin, a peak in the template image can be found using a peak-finding tool, such as convolving the template image with a first difference operator. For example, the first peak found can be designated as the origin of the template image. Alternatively, a maximum peak can be found and designated as the origin.

Optionally, portions of the template image that do not relate to the reference features can be deleted (110) so that the template image does not include confusing information. The resulting shortened one-dimensional template image can be implemented as a one-dimensional array of pixel values in memory.

Also optionally, the training signal can be normalized (112) to fall within a specified useful range, such as a 0–255 grey scale.

Turning now to the run-time phase, the goal of the run-time phase is to find the translational and rotational alignment parameters (ΔX and θ) of an object, such as a semiconductor wafer, with respect to a mask mounted on a stepper, for example. The output of the run-time phase is the actual translation and rotation offset parameters (ΔX and θ) that the stepper uses to align the mask with the wafer. To accomplish this, the run-time phase uses the result of the training phase, that is, the template image, to find the features on the wafer, thereby determining the translation ΔX and rotation θ offset parameters.

Figure 14:
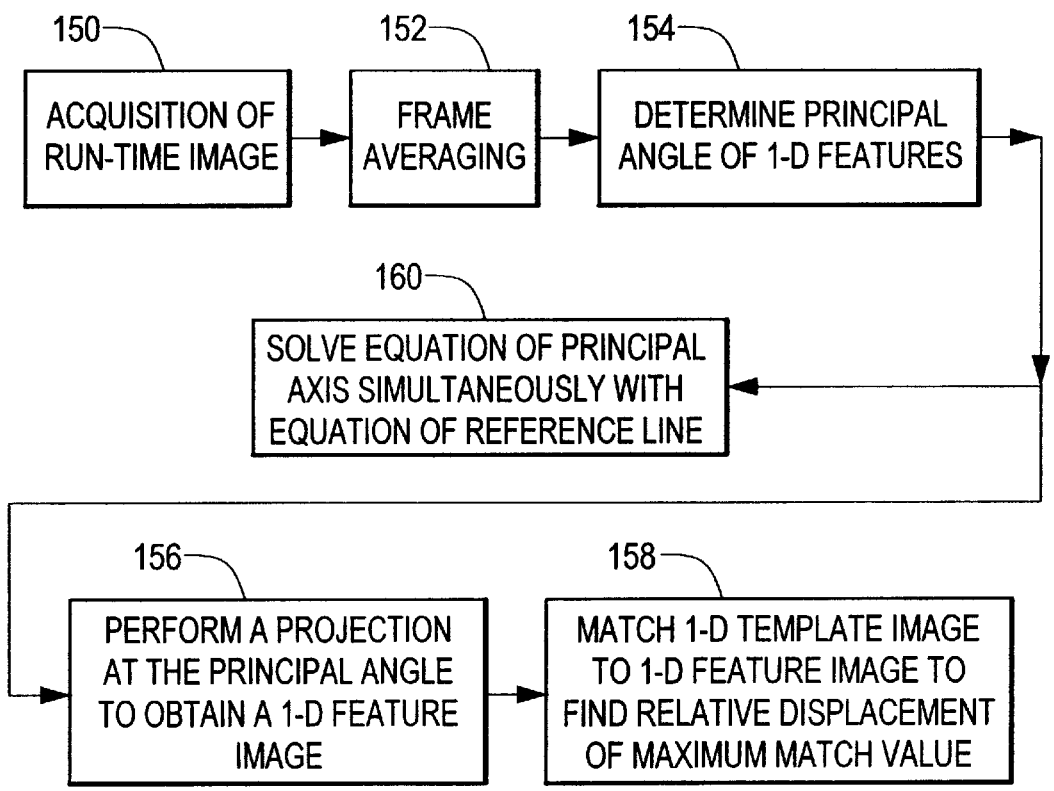
FIG. 14 is a flow chart of the steps performed at run-time for finding the position and orientation of a reference feature.

With reference to FIG. 14, at least one run-time image of the object is acquired (150). In some situations it may be critical to perform frame averaging (152) by acquiring several images and averaging them together, as discussed above. That is, each pixel of each newly-acquired image is averaged with the corresponding pixel of the previously-acquired images. This technique increases the signal-to-noise ratio of the run-time image, the image that is used to represent the reference feature to be found.

The angle of the principal axis of the reference feature in the run-time image is then determined by performing a one-dimensional search at several locations along the feature, generally as explained above in the context of empirical training, but with enhancements that modify the technique to account for degraded run-time images.

In particular, the run-time image is divided into two or more projection regions or bands, as shown in FIG. 12. The optimum number of regions depends on the actual rotational orientation of the reference feature on the object, and on the quality (i.e., s/n ratio) of the image of the reference feature.

In practice, the run-time phase of the method of the invention can work with a range of numbers of regions. The exact number of regions depends on the particular situation to which the method is being applied. Regardless of the application, the following rules of thumb apply. The number of regions needed increases as the principal angle θ of the image of the reference feature increases. Simultaneously, the number of regions needed decreases as s/n ratio of the image decrease. Under conditions where there is both very low s/n ratio and very high angle, the object must be pre-rotated to bring the principal angle as close to 0° as possible.

Under more favorable conditions, there will probably be more than one acceptable way to partition the reference feature into a plurality of regions. The range is found by trying a range of number of regions, and noting which numbers of regions result in finding the reference feature under study. The particular choice of number of regions depends on what aspect of system performance is to be optimized. A lesser number of regions will provide greater speed, but lesser accuracy, and less tolerance to large principal angles. Conversely, a greater number of regions will provide lesser speed, more accuracy, and more tolerance to large principal angle.

To reduce noise introduced by images extraneous to the reference feature, such as a reference pattern on the reticle in the optical path of a wafer stepper, the search results of one or more projection regions can be ignored in the calculation of principle angle θ.

The angle is then found (154) in the same manner as described above, using linear interpolation, for example.

Then, the pixels of the reference features in the inspection image are projected (summed) in the direction defined by the principal angle of the reference features to yield a one-dimensional feature image, which image is a X-ΣI plot, as is the template image. As in the case of empirical training explained above, the projection step at the principal angle (156) can be performed using any of the image projection techniques described previously.

Next, a matching step (158) (sometimes called a correlation step) is performed to find relative displacement ΔX that provides the best match between the one-dimensional template image from the training phase and the one-dimensional feature image from the run-time phase. The matching (or correlation) step 158 can be performed in the spatial or frequency domains. The choice of which domain in which to perform the matching depends upon the application. The technique used for matching can be a method such as normalized correlation. Absolute normalized correlation can be used to match features, even when the polarity of the features (i.e., dark pixels on a white background, or vice-versa) has been reversed. To match an inspection image of a wafer rotated 180° from the position used for the template image, simply reverse the direction of the template image by 180°.

Alternatively, instead of projecting in the direction of the principal angle to obtain a feature image and doing global matching with the template image, the equation of the best fit line can be solved simultaneously with a reference line that is in parallel relationship with the X-axis to provide a value for the displacement ΔX. For example, the reference line can be the line that is mid-way between the top-most pixel of the reference image and the bottom-most pixel of the reference image. Such a reference line would have an equation of the form Y=<height of reference line above X-axis>.

The result of the run-time phase is a one-dimensional (ΔX or ΔY) offset that indicates the translational location of the best match with respect to a pre-specified origin point in the template image. In addition, the rotational orientation θ of the reference feature can also be provided.

Figure 15:
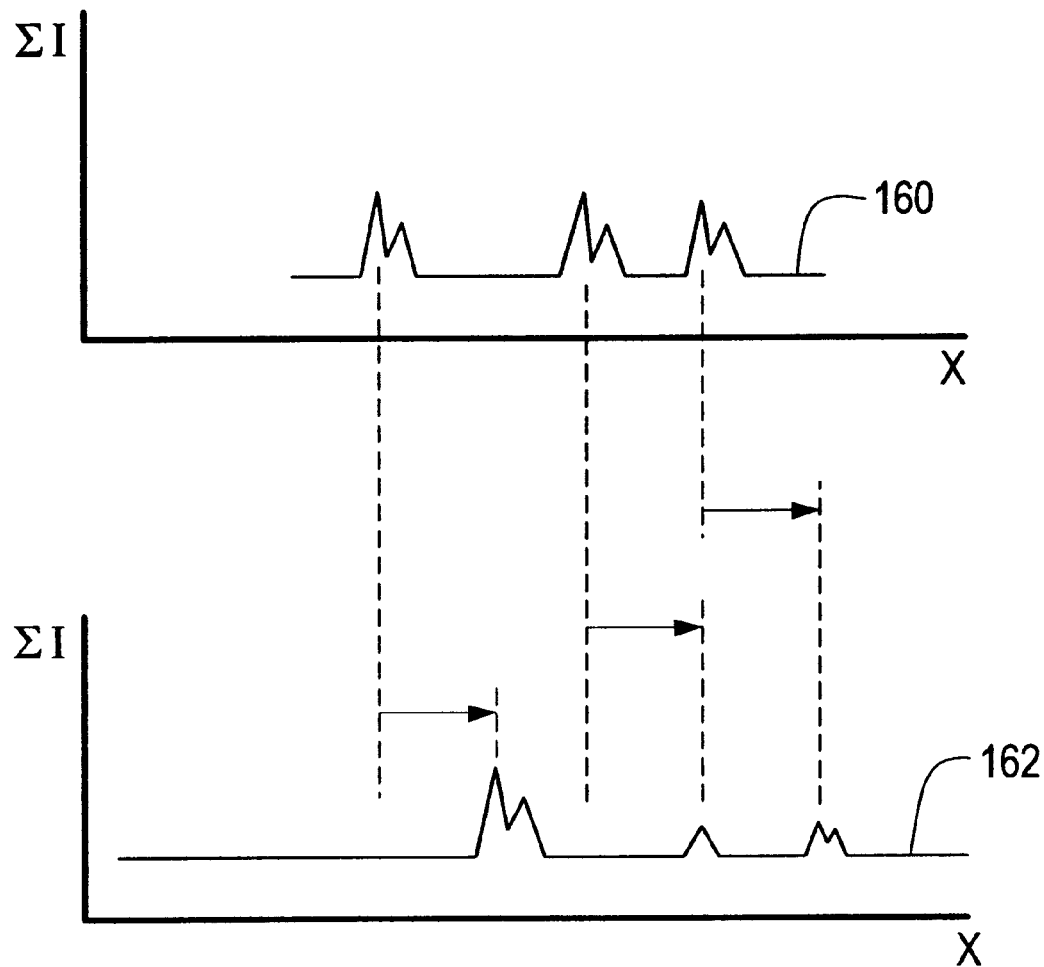
FIG. 15 is a combined graphical representation of a template image compared to an X-ΣI plot of summed pixel intensity I of the reference feature.

Previous to the invention, individual transitions (i.e., a rising edge and/or a falling edge) in the two dimensional reference feature image were used to determine the position of the reference feature, with a tool such as the Caliper Tool™, sold by Cognex Corporation. If one or more of the transitions is not distinct enough to detect, the reference feature associated with such indistinct transitions may not have been found. As shown in FIG. 15, the claimed invention overcomes this by performing a best-fit matching of a one-dimensional template image 160 (obtained at train-time) that represents the entire reference feature, to the feature image 162 obtained at run-time.

The invention is particularly useful for determining the position and orientation of reference feature images that have been degraded in some way, either by problems of lighting, variations in surface optical properties introduced by process steps, such as semiconductor processing steps, partial image occlusion, and video signal degradation, such as the introduction of video noise.

Figure 7B:
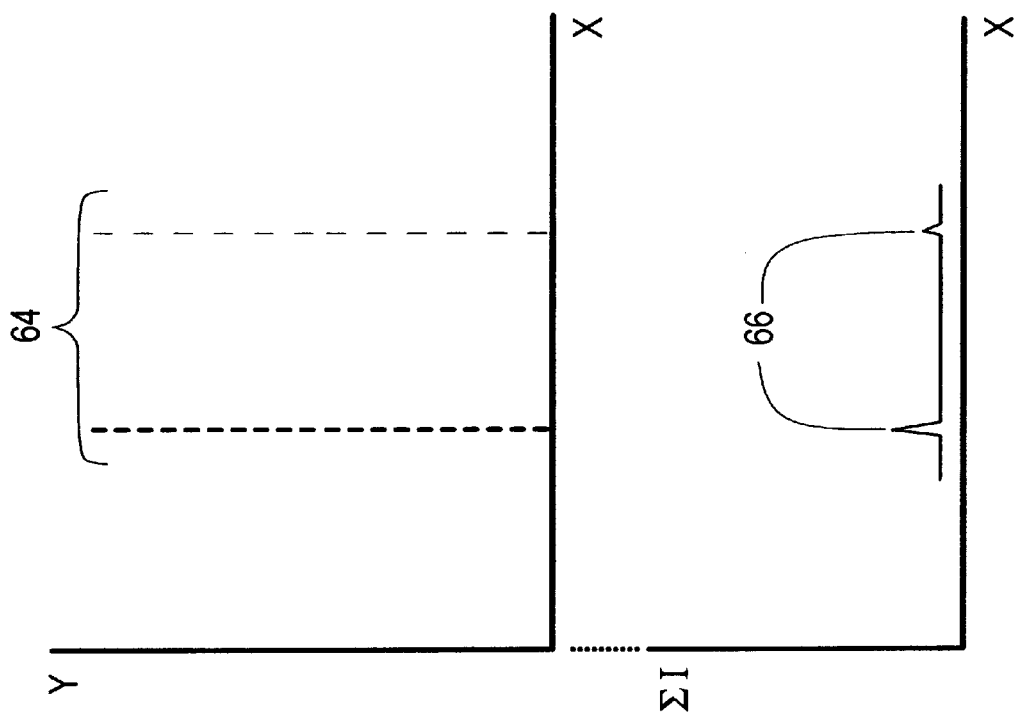
FIG. 7B is a combined graphical representation of a faint and partly visible reference feature in an X-Y coordinate system, and an X-ΣI plot of summed pixel intensity I of the reference feature taken in the Y-direction.
Figure 7A:
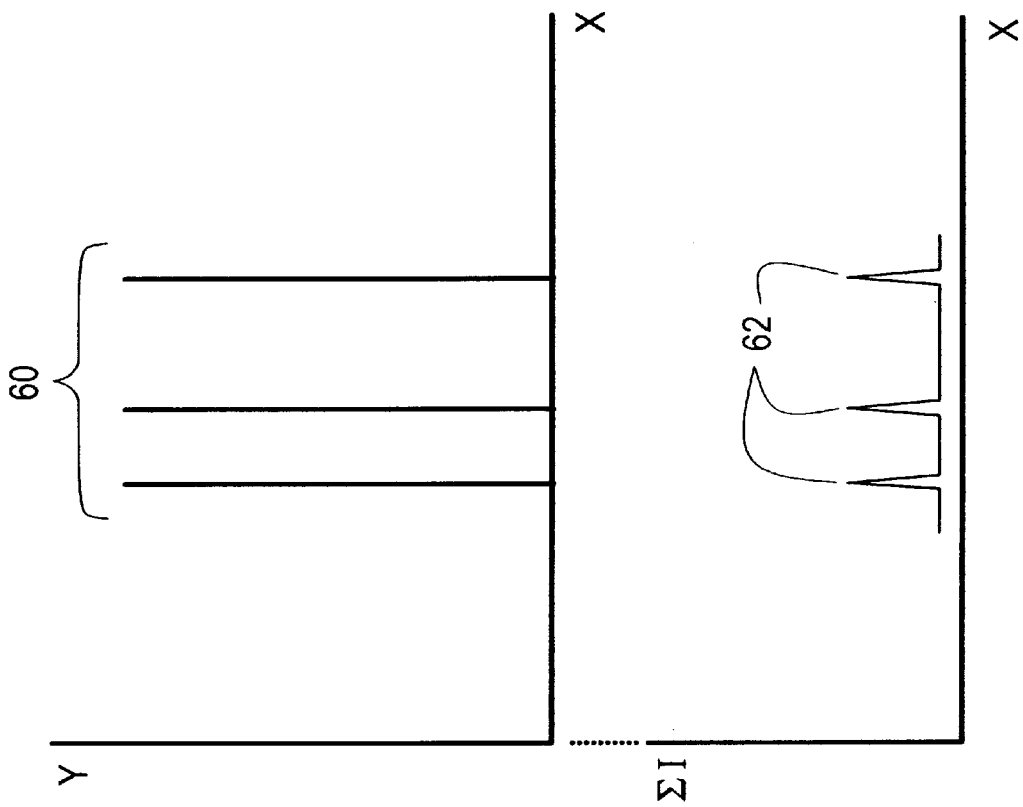
FIG. 7A is a combined graphical representation of a clearly visible reference feature in an X-Y coordinate system, and an X-ΣI plot of summed pixel intensity I of the reference feature taken in the Y-direction.

For example, referring to FIG. 7A, the reference features 60 appearing on the semiconductor wafer are clearly distinguishable after the original masking step. The one-dimensional summation signals 62 of each of these features are robust. However, as shown in FIG. 7B, after subsequent masking steps, the reference features 64 may be fainter or even apparently invisible. Portions of the corresponding one-dimensional summation signals 66 of each of these features are weak or effectively indistinguishable from background noise. However, the signal taken as a whole can be used successfully for template matching.

Thus, by matching over the entire one-dimensional image, the invention exploits information over the entire width of the image.

In addition, by projecting a two-dimensional reference feature to provide a one-dimensional image, image information of the entire length of the reference feature is consolidated, thereby providing a one-dimensional image that is more robust than the two-dimensional image.

Further, by using video averaging, various instances of an image over time can be combined to provide an image with less noise than any constituent image.

Thus, the invention provides substantial immunity to such image degradation by comprehensively exploiting image information derived from the entire reference feature. This can be understood by recognizing that the invention spans three independent dimensions, i.e., time, length, and width, to extract an image signal with optimized signal-to-noise ratio.

Figure 1:
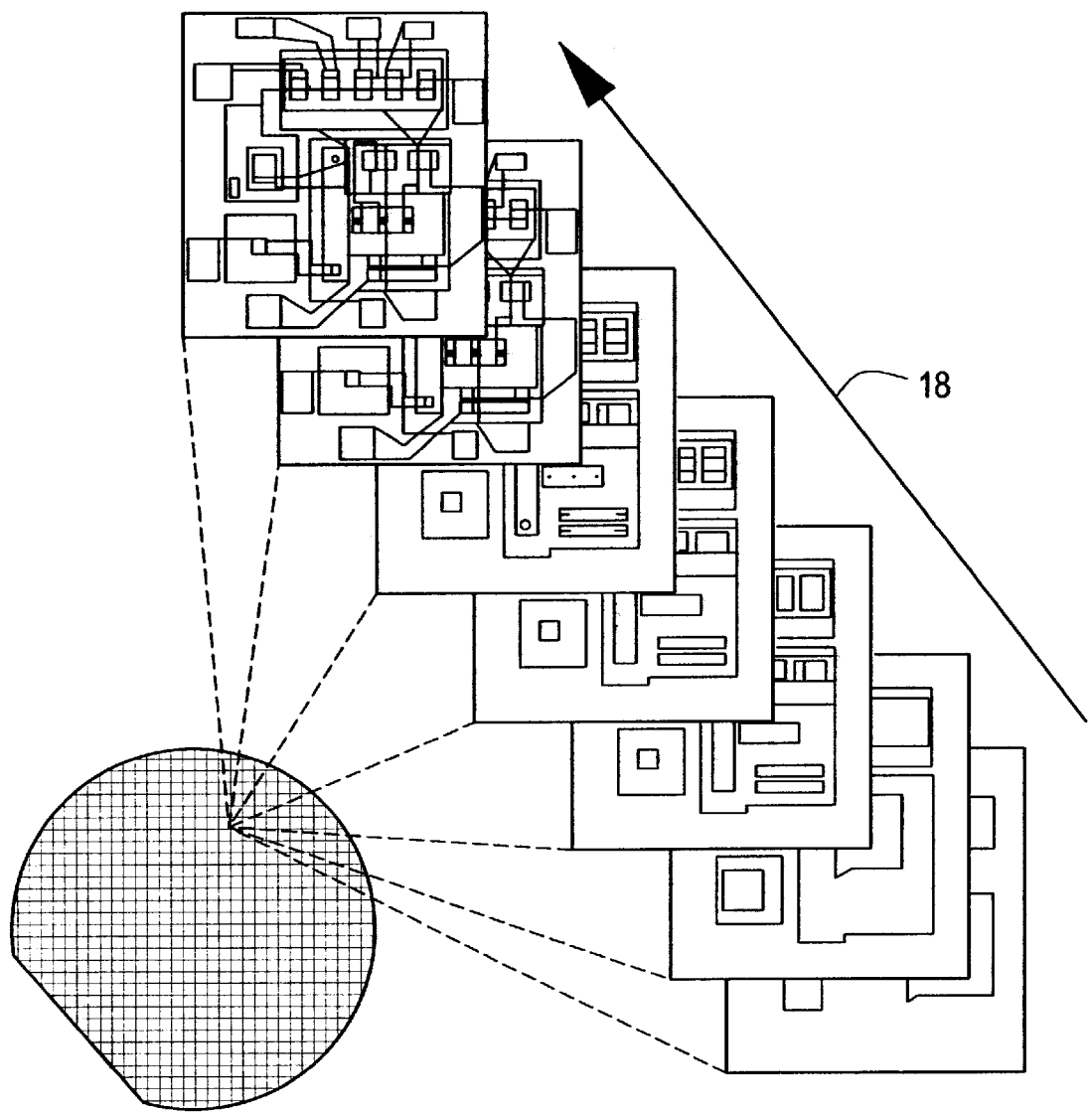
FIG. 1 is a process sequence diagram showing how the surface appearance of a die on a semiconductor wafer changes appearance over a sequence of process steps.
Figure 2:
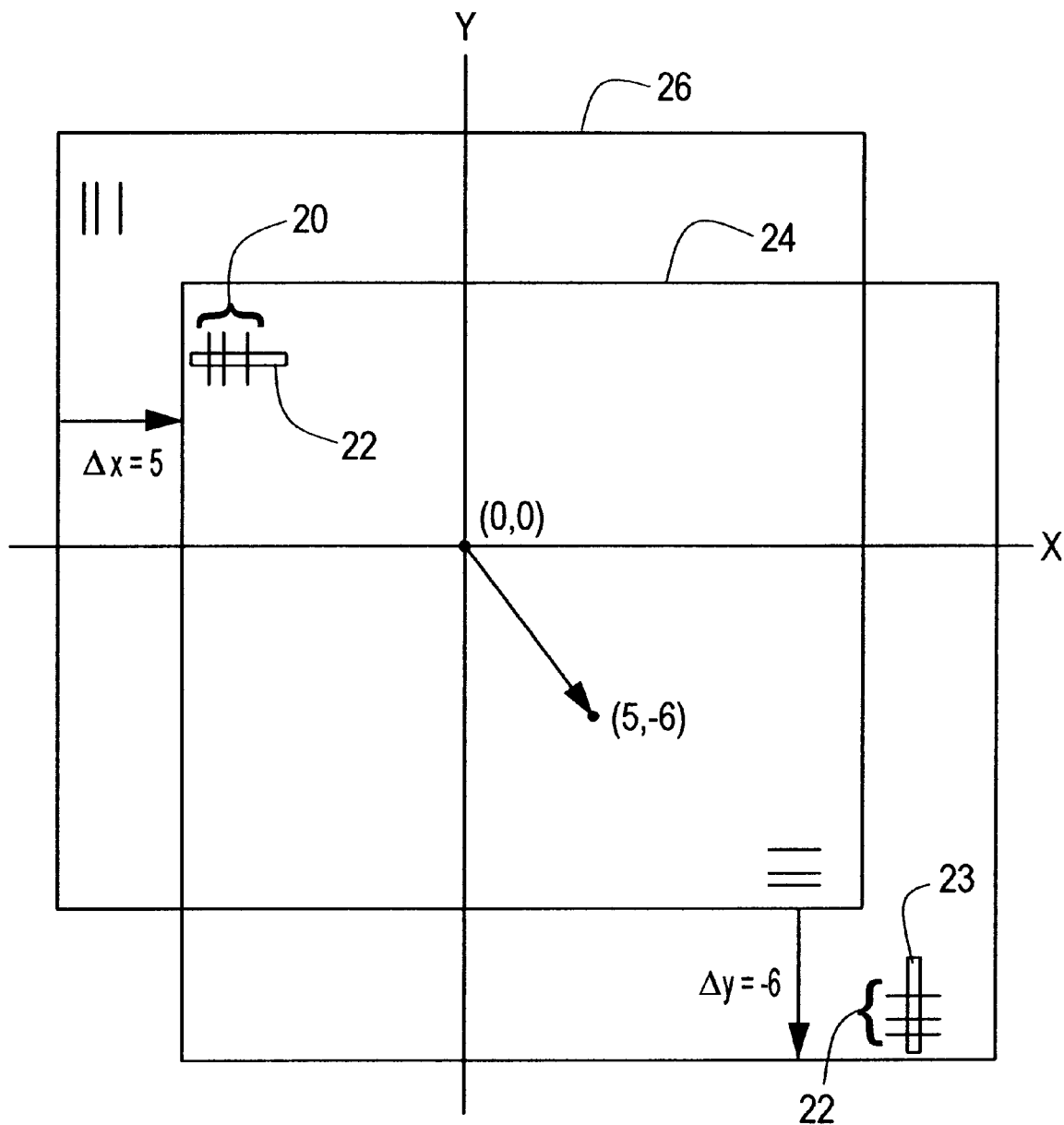
FIG. 2 is a graphical representation of a mask displaced in X and Y from its ideal position over a wafer.

The invention is ideally suited for use in the context of semiconductor processing, where precise alignment is required over a sequence of process steps. Referring to FIG. 2, to achieve alignment of a stepper with respect to a wafer, a translational offset (x,y) and optionally, a rotational offset (θ) of the stepper with respect to the wafer must be found. These data are then used to adjust the stepper position to achieve registration of the mask with respect to pre-existing patterns on the wafer. The two-dimensional (x,y) or three-dimensional (x,y,θ) offsets can be determined from the results of several one-dimensional searches for fiducial marks on the wafer, such as the set of vertical lines 20, and the set of horizontal lines 21.

In particular, a horizontal one-dimensional search, indicated by a search path 22, and a vertical one-dimensional search, indicated by a search path 23, yield x and y locations, respectively. For example, as shown in FIG. 2, a horizontal one-dimensional search 22 yields an X offset of 5, and a vertical one-dimensional search 23 yields a Y offset of −6. This indicates that the (x,y) offset of the mask 24 is offset by (5, −6) with respect to the ideal position 26. This (x,y) data represents the actual location of a point on the wafer which the stepper can use to reposition itself, and thereby align the mask 24 with respect to a particular position on the wafer.

Figure 3:
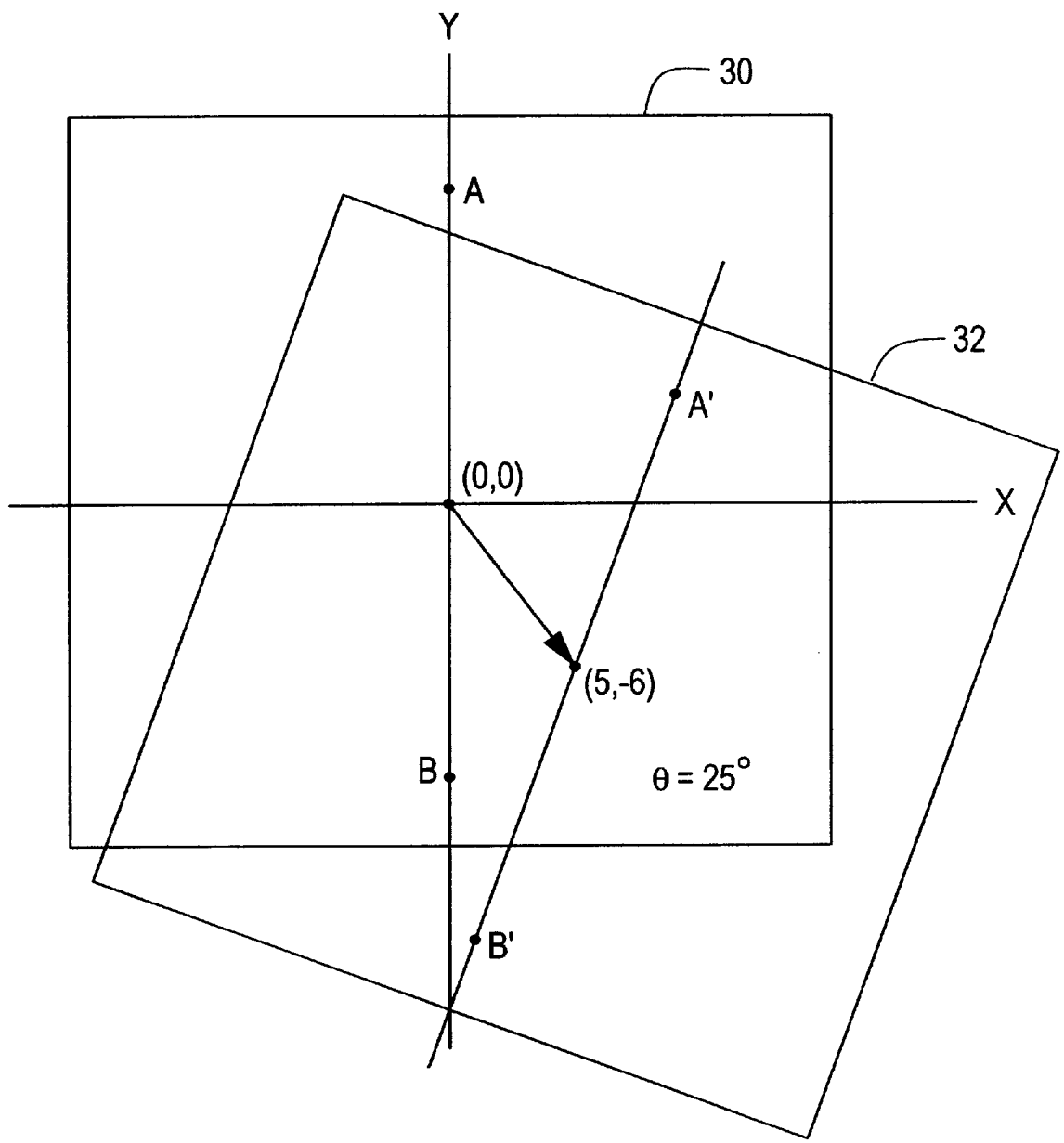
FIG. 3 is a graphical representation of a mask displaced in X, Y, and $\theta$ from its ideal position over a wafer.

Determination of the (x,y) offset of multiple locations on a mask can yield a rotational (θ) offset. As shown in FIG. 3, A and B are reference points of an ideal position 30, and A' and B' are the corresponding points found on the mask 32 at its actual location (5,−6,25°). The (x,y) translational offset (5,−6) and the rotational offset (25°) can be determined from a knowledge of the (x,y) offset of A' from A, and B' from B.

Figure 16:
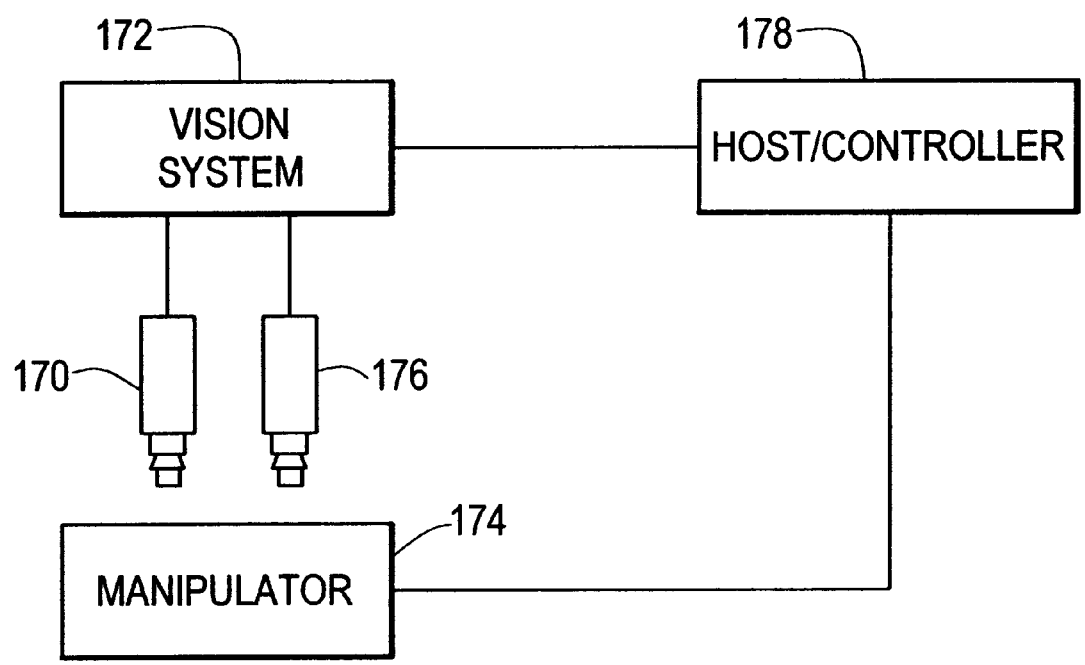
FIG. 16 is a general exemplary embodiment of the apparatus of the invention.

Referring to FIG. 16, in a general exemplary embodiment of the apparatus of the invention, a first camera 170 connected to a vision system 172 acquires and digitizes an image of a reference feature on an object, such as a semiconductor wafer, diposed on a manipulator 174, such as a moveable table of a wafer stepper. A second camera 176 can be used to acquire a template image. A host/controller 178 receives position and orientation information from the vision systme 172 that executes software that employs the method of the invention for determining the position and orientation of the reference feature.

Other modifications and implementations will occur to those skilled in the art without departing from the spirit and the scope of the invention as claimed. Accordingly, the above description is not intended to limit the invention except as indicated in the following claims.

What is claimed is:

1. A method for determining the location and orientation of a reference feature in an image, the method comprising:
   acquiring at least one run-time image having a reference feature, the reference feature including a plurality of substantially straight lines;
   determining from said at least one run-time image a principal axis of said reference feature such that the principal axis is parallel to most of the substantially straight lines of the reference feature, said principal axis being oriented at a principal angle; and
   performing projection upon the reference feature at said principal angle by summing substantially along each substantially straight line of the plurality of substantially straight lines to provide a one-dimensional feature image of the reference feature;
   performing a global match of said one-dimensional feature image with a one-dimensional template image to provide a position value of said global match; and
   using said position value to determine the location of said reference feature.

2. The method of claim 1, wherein the step of acquiring at least one run-time image includes the step of frame averaging at least two run-time images.

3. The method of claim 1, wherein the step of determining a principal axis oriented at a principal angle of said reference feature includes the steps of:
   determining the position of at least two points on a line in parallel relationship with said principal axis of said reference feature; and
   determining the equation of a line that is closest to all of said at least two points.

4. The method of claim 3, wherein the step of determining the position of at least two points on a line in parallel relationship with said principal axis of said reference feature includes the steps of:

partitioning said reference feature into at least two regions;

for each region, projecting a portion of said reference feature within each region at an angle of zero degrees with respect to a reference axis to provide at least two one-dimensional feature images;

for each region, performing a global match with said one-dimensional feature image using a one-dimensional template image to provide a position value of said global match; and using at least two of said position values to determine the positions of said at least two points.

5. The method of claim 1, wherein the step of using said principal axis oriented at said principal angle to determine the location of said reference feature includes the steps of:

providing a reference line;

finding an intersection point of said principal axis and said reference line; and using said intersection point to determine the location of said reference feature.

6. An apparatus for determining the location and orientation of a reference feature in an image, the apparatus comprising:

digitizing means for acquiring at least one run-time image having a reference feature, the reference feature including a plurality of substantially straight lines;

means, connected to said digitizing means, for determining from said at least one run-time image a principal axis of said reference feature such that the principal axis is parallel to most of the substantially straight lines of the reference feature, said principal axis being oriented at a principal angle; and means, connected to said means for determining a principal axis, for performing projection upon the reference feature at said principal angle by summing substantially along each substantially straight line of the plurality of substantially straight lines to provide a one-dimensional feature image of the reference feature;

means, connected to said means for performing projection, for performing a global match of said one-dimensional feature image with a one-dimensional template image to provide a position value of said global match; and means, connected to said means for performing a global match, for using said position value to determine the location of said reference feature.

7. The apparatus of claim 6, wherein the digitizing means for acquiring at least one run-time image includes:

means for frame averaging at least two run-time images.

8. The apparatus of claim 6, wherein said means for determining a principal axis oriented at a principal angle of said reference feature includes:

means for determining the position of at least two points on a line in parallel relationship with said principal axis of said reference feature; and means, connected to said means for determining the position of said at least two points, for determining the equation of a line that is closest to all of said at least two points.

9. The apparatus of claim 8, wherein said means for determining the position of at least two points on a principal axis of said reference feature includes:

means for partitioning said reference feature into at least two regions;

for each region, means for projecting a portion of said reference feature within each region at an angle of 0 degrees with respect to a reference axis to provide at least two one-dimensional feature images;

for each region, means for performing a global match with said one-dimensional feature image using a one-dimensional template image to provide a position value of said global match; and means for using at least two of said position values to determine the positions of said at least two points.

10. The apparatus of claim 6, wherein the means for using said principal axis oriented at said principal angle to determine the location of said reference feature includes:

means for providing a reference line;

means for finding an intersection point of said principal axis and said reference line; and means for using said intersection point to determine the location of said reference feature.

\* \* \* \* \*